Patented Oct. 15, 1940

2,218,235

UNITED STATES PATENT OFFICE 2,218,235

METHOD FOR PREPARING CELLULOSE PIGMENT

Charles L. Fletcher and Guy A. Kirton, Kingsport, Tenn., assignors to Eastman Kodak Company, Rochester, N. Y., a corporation of New Jersey No Drawing. Application August 11, 1938
Serial No. 224,357

3 Claims. (Cl. 260—212)

This invention relates to the treatment of cellulose with a solution of sulfuric acid in a lower fatty acid to render it suitable for use in making translucent plastics.

In the various applications of plastics, particularly cellulose ester plastics there are cases where a slight but definite degree of translucency is desirable to give a lightly frosted or subdued effect. Also there are cases where a decided frosted effect is desired. By means of the cellulose material of our invention the desired effect may be imparted to plastic material by incorporating therein the desired amount of this material.

It might be attempted to obtain this effect by incorporating a finely divided cellulose, such as finely ground cotton or wood pulp, into the plastic material but these materials cannot be satisfactorily dispersed in the plastic. The product resulting is of uneven translucency the cellulose particles forming clumps therein.

The forming of a material, having translucency in the form of a plastic, by incompletely acetylating cellulose and placing dependence on the unacetylated or poorly acetylated cellulose to impart the translucency has been suggested. In that case a product of poor quality would be obtained and its character would be difficult to control. Also by this method it would be impossible to control the degree of translucency of the plastic prepared therefrom. The product of this prior method consists of a mixture of cellulose acetates varying from very little to complete esterification. This would have the effect of lowering the strength and general quality of the plastics made from such material.

One object of our invention is to provide a comminuted cellulose which can be uniformly distributed in plastic materials. Another object of our invention is to provide a process for making a comminuted cellulose which imparts translucency to plastic materials. A further object of our invention is to provide plastics having a lightly frosted effect for use where transparency is not desirable.

The preparation of a plastic forming material has been proposed in which cellulose material is treated with an acetylating agent in an amount insufficient to completely acetylate the cellulose. The unacetylated material is alleged to function as a binder and re-enforcing medium in the plastic composition using the incompletely acetylated cellulose. Also a translucent or opaque plastic material is obtained. This product is of poor quality due to its non-uniformity, the mass being a mixture of cellulose acetates varying in composition from very little to possibly complete esterification. The variation in properties of the different parts would have the effect of lowering the strength and general quality of the plastics made from such material.

If a product of a definite degree of translucency is desired, this prior method offers many difficulties and would necessitate blending two or more batches of different degrees of translucency.

We have found that a pigmenting material of definite pigmenting characteristics may be prepared by treating cellulose such as refined cotton linters or wood pulp with a solution of sulfuric acid in a lower fatty acid at a moderate temperature. The fatty acid may be acetic, propionic or butyric acid altho acetic is preferred due to its low cost and ready solubility. 5% is the practical upper limit for the proportion of concentrated sulfuric acid. If the breakdown is not sufficient, it is more economical to increase the temperature rather than the proportion of catalyst altho larger quantities of catalyst may be used. If desired the time rather than the temperature might be increased, to increase the breakdown of the cellulose.

At a given sulfuric acid concentration the time of treatment is inversely proportional to the temperature of treatment. With a constant temperature the time is inversely proportional to the sulfuric acid concentration. By "breakdown" of the cellulose is meant the shortening of the fiber length. The fiber length desired will vary with different applications and the satisfactory fiber length for a particular use can be determined by experience.

It is desirable to have the breakdown of the cellulose take place within 2 to 10 hrs. in order to get a more uniform breakdown thus giving a product of uniform fiber length. If desired the concentration of sulfuric acid might be reduced to such a point (such as 0.1% or less) that temperatures above the boiling point of acetic acid might be required to bring the reaction thru in a reasonable time. In such a case it would be practical to carry out the reaction under pressure. If desired refluxing could be employed instead.

We have found that a concentration of 1% of sulfuric acid and a temperature of 120° F. to be quite satisfactory, requiring a 3 hr. period of treatment to obtain the desired fiber length.

The following example illustrates the preparation of cellulose pigment in accordance with our invention:

1 lb. of cotton linters, having a cuprammonium viscosity of 10,000 centipoises and a soda-soluble content of 3%, was treated with a mixture of 52 cc. of 96% sulfuric acid and 24 lbs. of glacial acetic acid. The whole was stirred 3½ hours at a temperature of 100° F. The acid was drained off and the cellulose was centrifuged after which it was washed with water until free of acid. If desired, the washing might be counter-current, in which case the centrifuging could be dispensed with. The fibers were then dried at an elevated temperature below that which would cause charring of the cellulose, such as 200–300° F. The resulting product was a fine, dust-like mass which could be uniformly incorporated in a plastic materi The following table gives conditions which are suitable for preparing treated cellulose which is useful in plastic compositions especially those having a predominating proportion of cellulose ester. Other combinations of suitable conditions may easily be determined from those given:

| Temperature, °F. | Time, hours | Concentration of $H_2SO_4$, percent |
|---|---|---|
| 120 | 3 | 1 |
| 80 | 4½ | 1 |
| 150 | 2½ | 1 |
| 120 | 6 | 0.5 |
| 120 | 9 | 0.33 |
| 90 | 4 | 1 |
| 90 | 2 | 2 |

Although the treating solution will tolerate some water, the presence of a few per cent not being fatal to the treatment, nevertheless, it is desirable to have as nearly anhydrous conditions as possible, in the absence of anhydride, to assure a good breakdown of the cellulose.

The presence of water slows up the breakdown, the fastest rate being with glacial acid and falling off rapidly to about 30% water beyond which the breakdown is negligible.

A sample of plastic employing the cellulose resulting from the process of the example was prepared as follows:

100 parts of low viscosity cellulose acetate which had been comminuted in a ball mill was thoroughly mixed with 37½ parts of tripropionin, ½ part of the special cellulose as prepared in the example and .045 parts of ultramarine blue. The composition was then rendered plastic by passing over heated rolls and was pressed into the form of a sheet having a thickness of about 0.1 in. Objects were indistinguishable when looking thru the sheet unless quite close but nevertheless the degree of translucency was such that a considerable amount of light passed therethru even though the sheet was colored.

As our cellulose pigment is used by suspending in the plastic composition, its use is not limited to any one type of plastic but may be used in any type of molding composition which starts with, or goes thru, either a powder or dope stage or some step whereby the fine dust-like fibers may be worked uniformly into the plastic. As our cellulose pigment is particularly intended for cellulose esters the following table illustrates suitable compositions using this pigment:

| Plasticizer | Cellulose pigment | Cellulose ester | Acetone viscosity of the ester (sec.) |
|---|---|---|---|
| | Parts | | |
| 37½ parts tripropionin. | 4 | 100 parts cellulose acetate. | 60 |
| Do. | 2 | ----do---- | 50–80 |
| 40 parts diethyl phthalate. | 6 | ----do---- | 50–80 |
| 40 parts diamyl phthalate. | 8 | 100 parts cellulose acetate propionate. | 577 |
| 35 parts diamyl phthalate | 10 | ----do---- | 13 |
| 40 parts diamyl phthalate. | 4 | 100 parts cellulose acetate butyrate. | 50 |
| 35 parts diamyl phthalate. | 8 | ----do---- | 10 |

The plastic compositions, which we have described herein, may be employed in various connections where the transmittal of light is to be subdued such as in lamp shades, translucent dials for instruments such as clocks, speedometers, etc., with lighting from behind or where a subdued or a semi-indirect lighting effect is desired.

We claim:

1. A method for preparing a comminuted cellulose for imparting uniform translucency when incorporated in plastic compositions which comprises treating fibrous cellulose with a substantially anhydrous solution, free of anhydride, essentially consisting of acetic acid and sulfuric acid in an amount not more than 5% based on the acetic acid for 2–10 hours, washing the treated cellulose with water and drying it at an elevated non-charring temperature.

2. A method for preparing a comminuted cellulose for imparting uniform translucency when incorporated in plastic compositions which comprises treating fibrous cellulose with a substantially anhydrous solution, free of anhydride, essentially consisting of acetic acid and sulfuric acid in an amount approximately 1% based on the acetic acid for three hours at 120° F., washing the treated cellulose with water and drying it at an elevated non-charring temperature.

3. A method for preparing a comminuted cellulose, for imparting uniform translucency when incorporated in plastic compositions, which comprises treating fibrous cellulose with a solution, free of anhydride, essentially consisting of fatty acid of 2–4 carbon atoms, sulfuric acid in an amount not more than 5% based on the lower fatty acid and 0–30% of water for a time between 2 and 10 hours which will give a finely comminuted cellulose, washing with water and drying at an elevated non-charring temperature.

CHARLES L. FLETCHER.
GUY A. KIRTON.